J. G. CATES.
Weed-Turner.
No. 222,011.  Patented Nov. 25, 1879.
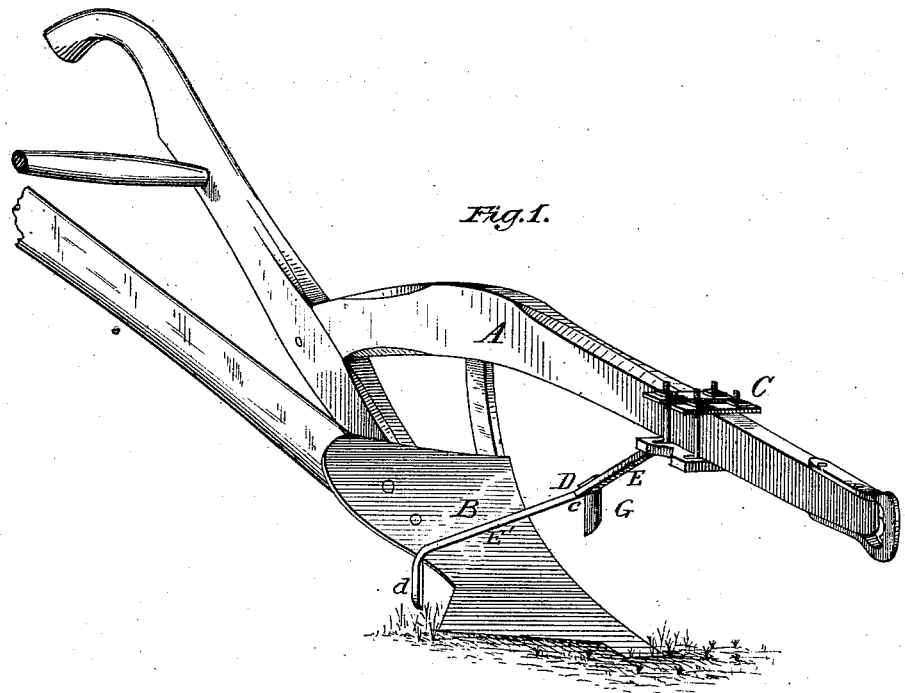
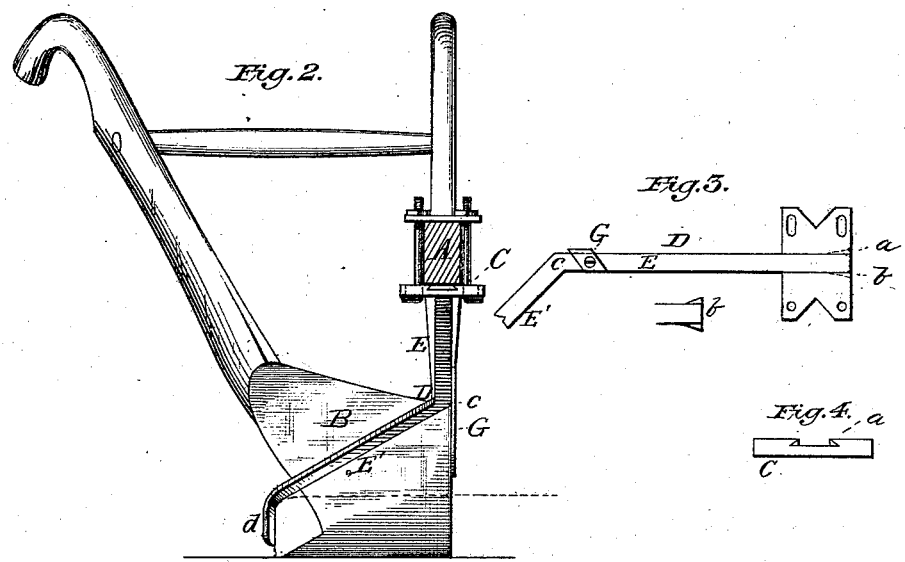
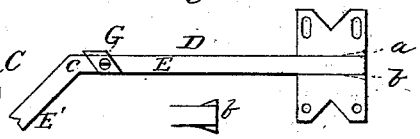
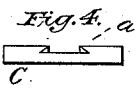

UNITED STATES PATENT OFFICE.

JOHN G. CATES, OF RUSSELLVILLE, KENTUCKY.

IMPROVEMENT IN WEED-TURNERS.

Specification forming part of Letters Patent No. 222,011, dated November 25, 1879; application filed September 23, 1878.

*To all whom it may concern:*

Be it known that I, JOHN GREEN CATES, of Russellville, in the county of Logan and State of Kentucky, have invented a new and valuable Improvement in Weed-Turners for Plows; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a perspective view of my improved weed-turner applied. Fig. 2 is a front view of the same, the plow and beam being in section; and Figs. 3 and 4 are details.

This invention has relation to means for pressing down and turning under the furrow weeds in plowing.

The nature of the invention consists in the construction and novel arrangement of parts, as hereinafter shown and described.

In the accompanying drawings, the letter A designates any ordinary plow-beam, and B the mold-board of a plow.

C represents a clip, whereby the weed-turning bar is attached to said beam. This clip has a dovetail recess, *a*, formed in its lower plate, in which the end *b* of the bar, slightly increasing in width toward its front end, is laid, and thereby a connection is formed, which increases in security according to the rearward pull or drag of the bar.

D indicates the weed-folding bar. This bar is made of flat iron, having at its front end a horizontal dovetail tang, *b*, designed to engage with the recess *a* of the clip, as above described. From this tang the bar extends downward obliquely, its main portion or stem E running to the rear under the beam and over the land-side to a point in front of the mold-board, but sufficiently distant therefrom to permit the passage underneath of the sod and the pressed-down weeds. This bar is flat, its wider surfaces being above and below.

At the point referred to the bar branches laterally, but in the same plane, forming at its middle portion an obtuse angle or elbow, *c*, whence the branch or turning portion E' extends across the mold-board to its outer edge, when the end of the bar turns downward, forming a guide, *d*, which extends into the furrow and works along the cut edge of the furrow-slice being turned.

The flat form of the bar is preserved in the lateral or turning portion, and, being here obliquely arranged, affords an under-inclined surface, which draws the weeds down by a gradually-increasing pressure. At the same time the strength of the bar is maintained, so that it will readily overcome or spring out of the way of obstructions without being damaged.

On the land-side edge of the main stem is arranged a divider, G, which consists of a body, which rests on said main stem and is secured thereto by a bolt and nut or screw, and the blade, which extends downward in the direction of the land-side edge of the plow a sufficient distance to separate the weeds of the furrow-slice being turned from those of the next slice. Usually this divider is made detachable, as stated, it being sometimes desirable to use the turner attachment without it, as when scattered straw is to be turned under for the benefit of the soil.

The object of the bar thus constructed is to form a support for the cutter G in a line with the plane of the front of the mold-board, and to form a guide at the opposite side of said mold-board, and at the same time to render the portion of the bar between the point *c* and the part *d* sufficiently rigid as to not be bent out of shape by the strain upon said bar. This latter object is accomplished by bending the intermediate portion in the plane of its width—that is to say, so that such portion of the bar will present its edge to the strain instead of its width. The portion between the point of attachment and the point *c* gives the proper elasticity to the whole to allow the bar to spring when too great a strain comes upon it.

I am aware that weed-turners attached to plow-beams and having the same general curvatures have been used, and also provided with cutters, as in the patent to I. Eastwood, No. 106,344. Hence I only claim my specific features of construction.

Having described this invention, what I claim, and desire to secure by Letters Patent, is—

In a weed-turner, the angular flat bar D, having the dovetailed end $b$ secured to the clip C, and bent backwardly and downwardly in a line with the plane of the forward edge of the mold-board to a point, $c$, then laterally across the front of the mold-board, and then downwardly to form a guide, $d$, in combination with the mold-cutter G, secured to the portion of the bar between the clip and the point $c$, substantially as and for the purpose specified.

In testimony that I claim the above I have hereunto subscribed my name in the presence of two witnesses.

J. G. CATES.

Witnesses:
WALTER C. MASI,
JOHN A. ELLIS.